(12) United States Patent
Wang et al.

(10) Patent No.: US 9,635,592 B2
(45) Date of Patent: *Apr. 25, 2017

(54) METHOD FOR CONTROLLING CELL ACTIVATION, BASE STATION, AND TERMINAL

(71) Applicant: HUAWEI TECHNOLOGIES CO., LTD, Shenzhen, Guangdong (CN)

(72) Inventors: Fan Wang, Stockholm (SE); Wenying Xu, Shanghai (CN); Xueli Ma, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/053,191

(22) Filed: Feb. 25, 2016

(65) Prior Publication Data
US 2016/0174115 A1    Jun. 16, 2016

Related U.S. Application Data

(63) Continuation of application No. 14/609,817, filed on Jan. 30, 2015, now Pat. No. 9,301,216, which is a
(Continued)

(51) Int. Cl.
*H04W 36/00*    (2009.01)
*H04W 76/02*    (2009.01)
(Continued)

(52) U.S. Cl.
CPC ....... *H04W 36/0055* (2013.01); *H04W 16/14* (2013.01); *H04W 76/025* (2013.01);
(Continued)

(58) Field of Classification Search
CPC ......... H04W 72/0406; H04W 74/0833; H04W 72/04; H04W 72/0446; H04W 72/0473;
(Continued)

(56) References Cited

U.S. PATENT DOCUMENTS 8,644,252 B2    2/2014    Wager
8,989,140 B2    3/2015    Zhang
(Continued)

FOREIGN PATENT DOCUMENTS

CN    102118805    7/2011
CN    102387508    3/2012
(Continued)

OTHER PUBLICATIONS

Notice of Allowance, dated Nov. 20, 2015, in U.S. Appl. No. 14/609,817.
(Continued)

*Primary Examiner* — Olumide T Ajibade Akonai
(74) *Attorney, Agent, or Firm* — Staas & Halsey LLP

(57) ABSTRACT

Embodiments of the present invention provide a method for controlling cell activation, a base station, and a terminal. According to the method for controlling cell activation, the base station, and the terminal that are provided in the embodiments of the present invention, through determination on cell identification information in the RRC signaling reconfiguration message, a corresponding cell remembers a previous activated state, or activation processing is performed, thereby implementing in an MF-Tx scenario, optimized configuration of an activated or deactivated state of the cell that participates in the multi-flow transmission when reconfiguration is implemented through RRC signaling.

9 Claims, 3 Drawing Sheets

Related U.S. Application Data continuation of application No. PCT/CN2012/079438, filed on Jul. 31, 2012.

(51) Int. Cl.

| | | |
|---|---|---|
| *H04W 16/14* | (2009.01) | |
| *H04W 76/04* | (2009.01) | |
| *H04W 28/18* | (2009.01) | |
| *H04W 24/02* | (2009.01) | |

(52) U.S. Cl.
CPC .......... *H04W 76/046* (2013.01); *H04W 24/02* (2013.01); *H04W 28/18* (2013.01); *H04W 36/0077* (2013.01)

(58) Field of Classification Search
CPC ........... H04W 76/025; H04W 36/0077; H04W 24/02; H04W 28/18; H04W 76/02; H04W 76/021; H04J 2011/0096; H04J 11/0023; H04B 17/309
USPC .................................. 455/436–444; 370/331
See application file for complete search history.

(56) References Cited

U.S. PATENT DOCUMENTS

| | | | |
|---|---|---|---|
| 9,301,216 B2* | 3/2016 | Wang .................. | H04W 76/025 |
| 2010/0034171 A1 | 2/2010 | Pelletier et al. | |
| 2012/0140689 A1 | 6/2012 | Pelletier et al. | |
| 2012/0163338 A1 | 6/2012 | Zhang et al. | |

FOREIGN PATENT DOCUMENTS

| | | |
|---|---|---|
| EP | 2775758 | 9/2014 |
| WO | WO2011/085809 | 7/2011 |
| WO | WO2012/006122 | 1/2012 |
| WO | WO2012041422 | 4/2012 |
| WO | WO2012/061770 | 5/2012 |

OTHER PUBLICATIONS

Extended European Search Report, dated Sep. 14, 2015, in corresponding European Application No. 12882347.3.
International Search Report dated May 9, 2013, in corresponding International Application No. PCT/CN2012/079438.
*LS on Summary of RAN1 agreements on Closed Loop Transmit Diversity*, 3GPP TSG-RAN-WG1 Meeting #68, Dresden, Germany, Feb. 2012, 2 pp.
*Change Request: Clarification of DTX/DRX activation status upon RRC reconfiguration*, Huawei, HiSilicon, 3GPP TSG-RAN1 Meeting #68bis, Jeju, Korea, Mar. 2012, 4 pp.
*3$^{rd}$ Generation Partnership Project; Technical Specification Group Radio Access Network; High Speed Packet Access (HSDPA) multipoint transmission (Release 11)*, 3GPP TR 28.872 V11.0.0, Sep. 2011, pp. 1-29.
*3$^{rd}$ Generation Partnership Project; Technical Specification Group Radio Access Network; Physical layer procedures (FDD) (Release 11)*, 3GPP TS 25.214 V11.2.0, Jun. 2012, pp. 1-108.
U.S. Appl. No. 14/609,817, filed Jan. 30, 2015, Wang et al., Huawei Technologies Co., Ltd.
Search Report and Written Opinion, dated Mar. 18, 2016, in Singapore Application No. 11201500756V (10 pp.).
Office Action, dated Oct. 8, 2016, in Chinese Application No. 201280018278.0, pp. 1-5.
3rd Generation Partnership Project; Technical Specification Group Radio Access Network; Physical layer procedures (FDD) (Release 11), 3GPP TS 25.214 V11.1.0 (Mar. 2012), pp. 1-106.
3rd Generation Partnership Project; Technical Specification Group Radio Access Network; Radio Resource Control (RRC); Protocol specification (Release 11), 3GPP TS 25.331 V11.1.0 (Mar. 2012), pp. 1-1911.
3rd Generation Partnership Project; Technical Specification Group Radio Access Network; Evolved Universal Terrestrial Radio Access (E-UTRA); Physical Channels and Modulation (Release 10), 3GPP Ts 36.211 V10.5.0 (Jun. 2012), pp. 1-101.
*Remaining issues of MF-Tx*, 3GPP TSG-RAN WG1 Meeting #70, R1-123821, Qingdao, China, Aug. 13-17, 2012, pp. 1-5.

* cited by examiner

METHOD FOR CONTROLLING CELL ACTIVATION, BASE STATION, AND TERMINAL

CROSS-REFERENCE TO RELATED APPLICATIONS

This application is a continuation of U.S. patent application Ser. No. 14/609,817, filed on Jan. 30, 2015, which is a continuation of International Patent Application No. PCT/CN2012/079438, filed on Jul. 31, 2012. The afore-mentioned patent applications are hereby incorporated by reference in their entireties.

TECHNICAL FIELD

Embodiments of the present invention relate to communications technologies, and in particular, to a method for controlling cell activation, a base station, and a terminal.

BACKGROUND

To improve throughput of an edge user equipment (User Equipment, UE for short) and downlink throughput performance of a cell, a 3rd generation partnership project (3rd Generation Partnership Project, 3GPP for short) wideband code division multiple access (Wide-band Code Division Multiple Access, WCDMA for short) system of R11 supports multi-flow transmission (Multi-Flow Transmission, MF-Tx for short) which allows multiple cells to simultaneously send high speed downlink packet access (High Speed Downlink Packet Access, HSDPA for short) data to the UE. For example, in a scenario of a dual frequency three cell (Dual Frequence-3Cell, DF-3C for short), a dual frequency four cell (Dual Frequence-4Cell, DF-4C for short), or a multiple frequency multiple cell (mFrequence-nCell, mF-nC for short), data of high speed downlink shared channels (High Speed Downlink Shared Channel, HS-DSCH for short) of three, four, or more cells is allowed to be sent to the UE simultaneously, and a serving cell of the UE is also allowed to be reconfigured by using a radio resource control (Radio Resource Control, RRC for short) message.

Currently, in a multi-flow transmission scenario, multiple cells serve one UE. When reconfiguration is implemented through RRC signaling and a cell serving the UE changes due to the reconfiguration through RRC signaling, there is an urgent need to propose a control method for configuring an activated or deactivated state of each cell.

SUMMARY

Embodiments of the present invention provide a method for controlling cell activation, a base station, and a terminal, so that in an MF-Tx scenario, configuration of an activated or deactivated state of a cell that participates in MF-Tx is optimized when reconfiguration is implemented through RRC signaling.

In a first aspect, an embodiment of the present invention provides a method for controlling cell activation, where the method includes:

receiving, by a base station, a radio resource control RRC reconfiguration message; and according to the RRC reconfiguration message, if a secondary cell served by the base station participates in multi-flow transmission and is a cell that participates in the multi-flow transmission before the base station receives the RRC reconfiguration message, keeping, by the base station, an activated or deactivated state of the secondary cell unchanged; and, if the secondary cell served by the base station participates in the multi-flow transmission but is not a cell that participates in the multi-flow transmission before the base station receives the RRC reconfiguration message, activating the secondary cell.

In a first possible implementation manner, the RRC reconfiguration message carries identification information of cells that participate in the multi-flow transmission.

In a second possible implementation manner, the RRC reconfiguration message carries cell identification information for serving cell change.

In a second aspect, an embodiment of the present invention provides a method for controlling cell activation, where the method includes:

receiving, by a base station, a radio resource control RRC reconfiguration message, where the RRC reconfiguration message carries state control indication information; and according to the RRC reconfiguration message, if a secondary cell served by the base station participates in multi-flow transmission and is a cell that participates in the multi-flow transmission before the base station receives the RRC reconfiguration message, and the state control indication information is keeping the state, keeping, by the base station, an activated or deactivated state of the secondary cell unchanged; and, if the secondary cell served by the base station participates in the multi-flow transmission but is not a cell that participates in the multi-flow transmission before the base station receives the RRC reconfiguration message, or the state control indication information is not keeping the state, activating the secondary cell.

In a first possible implementation manner, the RRC reconfiguration message carries identification information of cells that participate in the multi-flow transmission.

In a second possible implementation manner, the RRC reconfiguration message carries cell identification information for serving cell change.

In a third possible implementation manner, there are multiple pieces of state control indication information and multiple secondary cells, where each piece of the state control indication information corresponds to one secondary cell.

In a third aspect, an embodiment of the present invention provides a method for controlling cell activation, where the method includes:

receiving, by a terminal, a radio resource control RRC reconfiguration message; and according to the RRC reconfiguration message, if a secondary cell that participates in multi-flow transmission is a cell that participates in the multi-flow transmission before the terminal receives the RRC reconfiguration message, keeping, by the terminal, an activated or deactivated state of the secondary cell unchanged; and, if the secondary cell that participates in the multi-flow transmission is not a cell that participates in the multi-flow transmission before the terminal receives the RRC reconfiguration message, activating the secondary cell.

In a first possible implementation manner, the RRC reconfiguration message carries identification information of cells that participate in the multi-flow transmission.

In a second possible implementation manner, the RRC reconfiguration message carries cell identification information for serving cell change.

In a fourth aspect, an embodiment of the present invention provides a method for controlling cell activation, where the method includes:

receiving, by a terminal, a radio resource control RRC reconfiguration message, where the RRC reconfiguration message carries state control indication information; and according to the RRC reconfiguration message, if a secondary cell that participates in multi-flow transmission is a cell that participates in the multi-flow transmission before the terminal receives the RRC reconfiguration message, and the state control indication information is keeping the state, keeping, by the terminal, an activated or deactivated state of the secondary cell unchanged; and, if the secondary cell that participates in the multi-flow transmission is not a cell that participates in the multi-flow transmission before the terminal receives the RRC reconfiguration message, or the state control indication information is not keeping the state, activating the secondary cell.

In a first possible implementation manner, the RRC reconfiguration message carries identification information of cells that participate in the multi-flow transmission.

In a second possible implementation manner, the RRC reconfiguration message carries cell identification information for serving cell change.

In a third possible implementation manner, there are multiple pieces of state control indication information and multiple secondary cells, where each piece of the state control indication information corresponds to one secondary cell.

In a fifth aspect, an embodiment of the present invention provides a base station, where the base station includes:

a receiving unit, configured to receive a radio resource control RRC reconfiguration message; and a control unit, connected to the receiving unit and configured to: according to the RRC reconfiguration message, if a secondary cell served by the base station participates in multi-flow transmission and is a cell that participates in the multi-flow transmission before the base station receives the RRC reconfiguration message, keep an activated or deactivated state of the secondary cell unchanged; and, if the secondary cell served by the base station participates in the multi-flow transmission but is not a cell that participates in the multi-flow transmission before the base station receives the RRC reconfiguration message, activate the secondary cell.

In a first possible implementation manner, the RRC reconfiguration message carries identification information of cells that participate in the multi-flow transmission.

In a second possible implementation manner, the RRC reconfiguration message carries cell identification information for serving cell change.

In a sixth aspect, an embodiment of the present invention provides a base station, where the base station includes:

a receiving unit, configured to receive a radio resource control RRC reconfiguration message, where the RRC reconfiguration message carries state control indication information; and a control unit, connected to the receiving unit and configured to: according to the RRC reconfiguration message, if a secondary cell served by the base station participates in multi-flow transmission and is a cell that participates in the multi-flow transmission before the base station receives the RRC reconfiguration message, and the state control indication information is keeping the state, keep an activated or deactivated state of the secondary cell unchanged; and, if the secondary cell served by the base station participates in the multi-flow transmission but is not a cell that participates in the multi-flow transmission before the base station receives the RRC reconfiguration message, or the state control indication information is not keeping the state, activate the secondary cell.

In a first possible implementation manner, the RRC reconfiguration message carries identification information of cells that participate in the multi-flow transmission.

In a second possible implementation manner, the RRC reconfiguration message carries cell identification information for serving cell change.

In a third possible implementation manner, there are multiple pieces of state control indication information and multiple secondary cells, where each piece of the state control indication information corresponds to one secondary cell.

In a seventh aspect, an embodiment of the present invention provides a terminal, where the terminal includes:

a receiving unit, configured to receive a radio resource control RRC reconfiguration message; and a control unit, connected to the receiving unit and configured to: according to the RRC reconfiguration message, if a secondary cell that participates in multi-flow transmission is a cell that participates in the multi-flow transmission before the terminal receives the RRC reconfiguration message, keep an activated or deactivated state of the secondary cell unchanged; and, if the secondary cell that participates in the multi-flow transmission is not a cell that participates in the multi-flow transmission before the terminal receives the RRC reconfiguration message, activate the secondary cell.

In a first possible implementation manner, the RRC reconfiguration message carries identification information of cells that participate in the multi-flow transmission.

In a second possible implementation manner, the RRC reconfiguration message carries cell identification information for serving cell change.

In an eighth aspect, an embodiment of the present invention provides a terminal, where the terminal includes:

a receiving unit, configured to receive a radio resource control RRC reconfiguration message, where the RRC reconfiguration message carries state control indication information; and a control unit, connected to the receiving unit and configured to: according to the RRC reconfiguration message, if a secondary cell that participates in multi-flow transmission is a cell that participates in the multi-flow transmission before the terminal receives the RRC reconfiguration message, and the state control indication information is keeping the state, keep an activated or deactivated state of the secondary cell unchanged; and, if the secondary cell that participates in the multi-flow transmission is not a cell that participates in the multi-flow transmission before the terminal receives the RRC reconfiguration message, or the state control indication information is not keeping the state, activate the secondary cell.

In a first possible implementation manner, the RRC reconfiguration message carries identification information of cells that participate in the multi-flow transmission.

In a second possible implementation manner, the RRC reconfiguration message carries cell identification information for serving cell change.

In a third possible implementation manner, there are multiple pieces of state control indication information and multiple secondary cells, where each piece of the state control indication information corresponds to one secondary cell.

According to the method for controlling cell activation, the base station, and the terminal that are provided in embodiments of the present invention, a base station receives a radio resource control RRC reconfiguration message, where the RRC reconfiguration message carries identification information of cells that participate in multi-flow transmission; if the base station determines and learns, according to the RRC reconfiguration message, that a secondary cell of the base station participates in multi-flow transmission and is a cell that participates in the multi-flow transmission before the base station receives the RRC reconfiguration message, the base station keeps an activated or deactivated state of the secondary cell unchanged; and, if the secondary cell of the base station participates in the multi-flow transmission but is not a cell that participates in the multi-flow transmission before the base station receives the RRC reconfiguration message, the base station activates the secondary cell. This implements activation control for a cell in an MF-Tx work mode. Because the base station knows a cell load condition and an air interface condition more clearly, the activated or deactivated state of the cell can be optimally configured when a previous state is remembered.

BRIEF DESCRIPTION OF DRAWINGS

To describe the technical solutions in the embodiments of the present invention or in the prior art more clearly, the following briefly introduces accompanying drawings required for describing the embodiments or the prior art. Apparently, the accompanying drawings in the following description show merely some embodiments of the present invention, and a person of ordinary skill in the art may still derive other drawings according to these accompanying drawings without creative efforts.

DESCRIPTION OF EMBODIMENTS

To make the objectives, technical solutions, and advantages of the embodiments of the present invention more comprehensible, the following clearly and completely describes the technical solutions in the embodiments of the present invention with reference to the accompanying drawings in the embodiments of the present invention. Apparently, the embodiments to be described are merely a part rather than all of the embodiments of the present invention. All other embodiments obtained by a person of ordinary skill in the art based on the embodiments of the present invention without creative efforts shall fall within the protection scope of the present invention.

Figure 1:
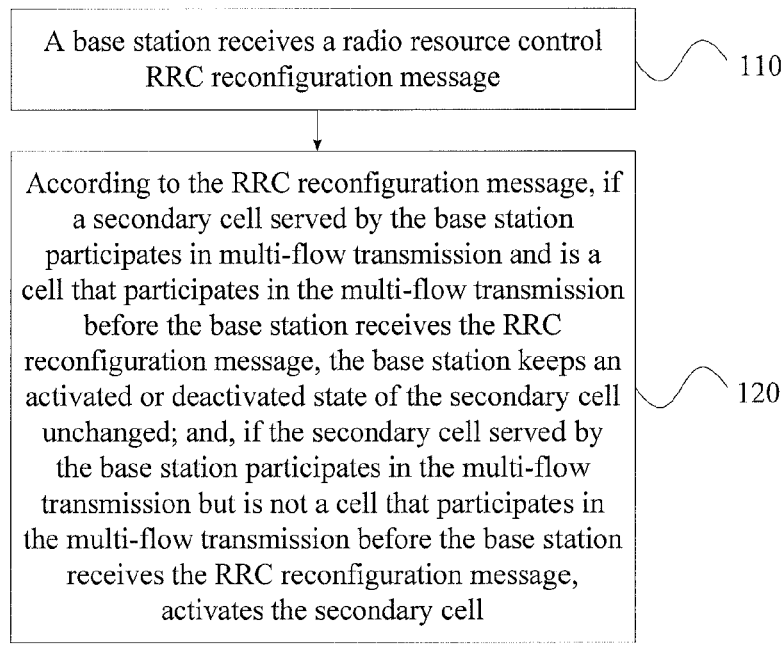
FIG. 1 is a flowchart of a first method for controlling cell activation according to an embodiment of the present invention.

FIG. 1 is a flowchart of a first method for controlling cell activation according to an embodiment of the present invention. As shown in FIG. 1, the method for controlling cell activation provided in this embodiment may be specifically applied to a cell activation control processing process in which a communications system supporting an MF-Tx work mode allows multiple cells to simultaneously send high speed downlink packet access data to a UE. The communications system may be a wideband code division multiple access (Wideband Code Division Multiple Access, WCDMA for short) communications system. The communications system may also be a long term evolution (Long Term Evolution, LTE for short) communications system. In the WCDMA communications system, a base station Node B and a radio network controller (Radio Network Controller, RNC for short) are provided. In the LIE communications system, an evolved base station (E-UTRAN Node B, eNB for short) can implement functions of the Node B and the RNC. The following uses the WCDMA communications system as an example to elaborate on the method for controlling cell activation provided in this embodiment.

The method for controlling cell activation provided in this embodiment specifically includes the following steps:

Step 110: A base station receives a radio resource control RRC reconfiguration message.

The RRC reconfiguration message carries cell identification information of multiple cells that participate in multi-flow transmission.

Specifically, in the MF-Tx work mode, a UE may simultaneously receive data sent by HS-DSCHs of the multiple cells at a cell edge. The multiple cells that participate in the MF-Tx may be served by a same base station or may also be served by different base stations. The cells that participate in the MF-Tx may be changed and cell reconfiguration may be caused by multiple factors. For example, the UE generally sends a measurement report to the base station; the base station sends the measurement report to an RNC; when the RNC learns, according to the measurement report, that channel quality of a cell currently serving the UE is poor or a cell that has better channel quality exists, the RNC may reconfigure a cell for the UE and generate an RRC reconfiguration message, where the RRC reconfiguration message carries the cell identification information of the multiple cells that participate in the MF-Tx, and the multiple cells are cells that are reconfigured and participate in the MF-Tx. The RNC sends the RRC reconfiguration message to the base station. When the cells that are reconfigured and participate in the MF-Tx are served by multiple base stations, the RNC sends the RRC reconfiguration message to the multiple base stations separately.

In a practical application process, a field in the RRC reconfiguration message is used to carry the cell identification information of the multiple cells that participate in the MF-Tx. The cell identification information of the multiple cells that participate in the MF-Tx specifically carries an identifier of a cell serving as a serving cell, an identifier of a cell serving as a primary cell, an identifier of a cell serving as a secondary cell, and an identifier of a cell serving as a secondary assisted cell, where both the secondary cell and the secondary assisted cell may be called secondary cells.

Step 120: According to the RRC reconfiguration message, if a secondary cell served by the base station participates in multi-flow transmission and is a cell that participates in the multi-flow transmission before the base station receives the RRC reconfiguration message, the base station keeps an activated or deactivated state of the secondary cell unchanged; and, if the secondary cell served by the base station participates in the multi-flow transmission but is not a cell that participates in the multi-flow transmission before the base station receives the RRC reconfiguration message, activates the secondary cell.

Specifically, if the base station determines and learns, according to the cell identification information of the multiple cells that participate in the MF-Tx, that a first cell served by the base station among the multiple cells that participate in the MF-Tx is the secondary cell, and the secondary cell is a cell that participates in the MF-Tx before the base station receives the RRC reconfiguration message, the base station keeps a state of the first cell unchanged, where the cell identification information is carried in the RRC reconfiguration message.

After receiving the RRC reconfiguration message sent by the RNC, the base station performs determination according to the cell identification information of the multiple cells that participate in the MF-Tx, where the cell identification information is carried in the RRC reconfiguration message; and keeps the state of the secondary cell unchanged if it is determined and learned that the first cell served by the base station among the multiple cells that are reconfigured and participate in the MF-Tx is the secondary cell, and the secondary cell is a cell that participates in the MF-Tx before the base station receives the RRC reconfiguration message. That is, if the cell state of the first cell is an activated state before the base station receives the RRC reconfiguration message, the first cell is kept in the activated state; and, if the cell state of the first cell is a deactivated state before the base station receives the RRC reconfiguration message, the first cell continues to be kept in the deactivated state.

If the base station determines and learns, according to the cell identification information of the multiple cells that participate in the MF-Tx, that a second cell served by the base station among the multiple cells that participate in the MF-Tx is the secondary cell but is not a cell that participates in the MF-Tx before the base station receives the RRC reconfiguration message, the base station activates the second cell, where the cell identification information is carried in the RRC reconfiguration message.

In a practical application, the RNC further transparently transmits the RRC reconfiguration message to the UE through the base station, so as to ensure a common knowledge about cell reconfiguration on a network side and a user equipment side.

According to the method for controlling cell activation provided in the embodiment of the present invention, a base station receives a radio resource control RRC reconfiguration message, where the RRC reconfiguration message carries identification information of cells that participate in MF-Tx; if the base station determines and learns, according to the RRC reconfiguration message, that a secondary cell of the base station participates in the MF-Tx and is a cell that participates in the MF-Tx before the base station receives the RRC reconfiguration message, the base station keeps an activated or deactivated state of the secondary cell unchanged; and, if the secondary cell of the base station participates in the MF-Tx but is not a cell that participates in the MF-Tx before the base station receives the RRC reconfiguration message, the base station activates the secondary cell. This implements reconfiguration through RRC signaling in an MF-Tx work mode, and implements activation control for a cell when the reconfiguration through RRC signaling causes a change to a cell serving a UE. Because the base station knows a cell load condition and an air interface condition more clearly, the activated or deactivated state of the cell can be optimally configured when a previous state is remembered.

In the foregoing embodiment, the RRC reconfiguration message carries cell identification information for serving cell change.

In one aspect, if the base station determines and learns, according to the cell identification information of the serving cell change, that a third cell served by the base station among the multiple cells that participate in the MF-Tx is the serving cell, and the serving cell is changed, the base station activates the third cell, where the cell identification information is carried in the RRC reconfiguration message.

Specifically, if the third cell served by the base station among the multiple cells that are reconfigured and participate in the MF-Tx is the serving cell and the third cell is not a serving cell that serves the UE before the base station receives the RRC reconfiguration message, that is, the serving cell is changed, the third cell is activated, so as to ensure that the serving cell is in the activated state.

In another aspect, if the base station determines and learns, according to the cell identification information of the serving cell change, that a fourth cell served by the base station among the multiple cells that participate in the MF-Tx is the serving cell, and the serving cell is not changed, the base station keeps the fourth cell in an activated state, where the cell identification information is carried in the RRC reconfiguration message.

Specifically, if the fourth cell served by the base station among the multiple cells that are reconfigured and participate in the MF-Tx is the serving cell and the fourth cell is also the serving cell that serves the UE before the base station receives the RRC reconfiguration message, that is, the serving cell is not changed, the fourth cell is kept in the activated state, so as to ensure that the serving cell is in the activated state.

In the foregoing embodiment, after the base station receives the radio resource control RRC reconfiguration message, the method may further include:

if the base station determines and learns, according to the cell identification information of the multiple cells that participate in the MF-Tx, that a fifth cell served by the base station among the multiple cells that participate in the MF-Tx is the primary cell, activating, by the base station, the fifth cell, where the cell identification information is carried in the RRC reconfiguration message.

Specifically, after the base station performs determination according to the cell identification information of the multiple cells that are reconfigured and participate in the MF-Tx, if the base station learns that the fifth cell served by the base station among the multiple cells that participate in the MF-Tx is the primary cell, the base station activates the fifth cell, so as to ensure the primary cell is in the activated state, where the cell identification information is carried in the RRC reconfiguration message.

To describe more clearly the method for controlling cell activation provided in the embodiment of the present invention, the following uses a base station working in a DF-4C mode as an example to elaborate on the method for controlling cell activation provided in this embodiment. The work mode is as follows: The number of cells that participate in the MF-Tx and provide services for the UE is four, where the four cells are cells that are served by different base stations and work at f1 and f2 frequencies separately. The method for controlling cell activation provided in the embodiment of the present invention is definitely applicable to an nF-mC mode, that is, a work mode in which the number of cells that participate in the MF-Tx and provide services for the UE is m, where the m cells are cells that are served by different base stations and work at frequencies f1, f2, to fn.

First Implementation Manner:

Before cell reconfiguration, cells that participate in the MF-Tx and provide services for the UE are two cells Cell1 and Cell2 of NodeB1 and two cells Cell3 and Cell4 of NodeB2. That is, Cell1, Cell2, Cell3, and Cell4 form cells that participate in the MF-Tx before the cell reconfiguration. Cell1 is a serving cell, and a frequency where Cell1 works is f1. Cell2 is a secondary cell of Cell1, and a frequency where Cell2 works is f2. Cell3 is an assisted cell of Cell1, and a frequency where Cell3 works is f1. Cell4 is a secondary assisted cell of Cell1, and a frequency where Cell4 works is f2. It should be noted that both Cell1 and Cell3 are primary cells. For ease of description, Cell1 is called the serving cell, and Cell3 is called the primary cell.

After the cell reconfiguration, the cells that participate in the MF-Tx and provide services for the UE are two cells Cell1 and Cell2 of NodeB1 and two cells Cell3 and Cell4 of NodeB2.

NodeB1 and NodeB2 receive the RRC reconfiguration message and learn, according to the cell identification information of the multiple cells that participate in the MF-Tx, that after the cell reconfiguration, the serving cell is Cell3, the primary cell is Cell1, the secondary cell is Cell4, and the secondary assisted cell is Cell2, where the cell identification information is carried in the RRC reconfiguration message. Because the secondary assisted cell Cell2 is a cell that participates in the MF-Tx and serves the UE before NodeB1 receives the RRC reconfiguration message, a state of the secondary assisted cell Cell2 is kept unchanged. The secondary cell Cell4 is a cell that participates in the MF-Tx and serves the UE before NodeB2 receives the RRC reconfiguration message, and a state of the secondary cell Cell4 is kept unchanged. Meanwhile, the serving cell Cell3 and the primary cell Cell4 are activated.

Second Implementation Manner:

Before cell reconfiguration, cells that participate in the MF-Tx and provide services for the UE are two cells Cell1 and Cell2 of NodeB1 and two cells Cell3 and Cell4 of NodeB2. That is, Cell1, Cell2, Cell3, and Cell4 form cells that participate in the MF-Tx before the cell reconfiguration. Cell1 is a serving cell, and a frequency where Cell1 works is f1. Cell2 is a secondary cell, and a frequency where Cell2 works is f2. Cell3 is a primary cell, and a frequency where Cell3 works is f1. Cell4 is a secondary assisted cell of Cell1, and a frequency where Cell4 works is f2.

After the cell reconfiguration, the cells that participate in the MF-Tx and provide services for the UE are two cells Cell3 and Cell4 of NodeB2 and two cells Cell5 and Cell6 of NodeB3. A frequency where Cell5 works is f1, and a frequency where Cell6 works is f2.

NodeB2 and NodeB3 receive the RRC reconfiguration message and learn, according to the cell identification information of the multiple cells that participate in the MF-Tx, that after the cell reconfiguration, the serving cell is Cell5, the primary cell is Cell3, the secondary cell is Cell6, and the secondary assisted cell is Cell4, where the cell identification information is carried in the RRC reconfiguration message. Because the secondary assisted cell Cell4 is a cell that participates in the MF-Tx and serves the UE before NodeB2 receives the RRC reconfiguration message, a state of the secondary assisted cell Cell4 is kept unchanged. The secondary cell Cell6 is not a cell that participates in the MF-Tx and serves the UE before NodeB3 receives the RRC reconfiguration message, and the secondary cell Cell6 is activated. Meanwhile, the serving cell Cell5 and the primary cell Cell3 are activated.

Third Implementation Manner:

Before cell reconfiguration, cells that participate in the MF-Tx and provide services for the UE are two cells Cell1 and Cell2 of NodeB1 and two cells Cell3 and Cell4 of NodeB2. That is, Cell1, Cell2, Cell3, and Cell4 form cells that participate in the MF-Tx before the cell reconfiguration. Cell1 is a serving cell, and a frequency where Cell1 works is f1. Cell2 is a secondary cell, and a frequency where Cell2 works is f2. Cell3 is a primary cell, and a frequency where Cell3 works is f1. Cell4 is a secondary assisted cell of Cell1, and a frequency where Cell4 works is f2.

After the cell reconfiguration, the cells that participate in the MF-Tx and provide services for the UE are two cells Cell1 and Cell2 of NodeB1 and two cells Cell3 and Cell4 of NodeB2.

NodeB1 and NodeB2 receive the RRC reconfiguration message and learn, according to the cell identification information of the multiple cells that participate in the MF-Tx, that after the cell reconfiguration, the serving cell is Cell1, the primary cell is Cell3, the secondary cell is Cell2, and the secondary assisted cell is Cell4, where the cell identification information is carried in the RRC reconfiguration message. The secondary cell Cell2 is a cell that participates in the MF-Tx and serves the UE before NodeB1 receives the RRC reconfiguration message, and a state of the secondary cell Cell2 is kept unchanged. The secondary assisted cell Cell4 is a cell that participates in the MF-Tx and serves the UE before NodeB2 receives the RRC reconfiguration message, and a state of the secondary assisted cell Cell4 is kept unchanged. Meanwhile, the serving cell Cell1 and the primary cell Cell3 are activated.

Fourth Implementation Manner:

Before cell reconfiguration, cells that participate in the MF-Tx and provide services for the UE are two cells Cell1 and Cell2 of NodeB1 and two cells Cell3 and Cell4 of NodeB2. That is, Cell1, Cell2, Cell3, and Cell4 form cells that participate in the MF-Tx before the cell reconfiguration. Cell1 is a serving cell, and a frequency where Cell1 works is f1. Cell2 is a secondary cell, and a frequency where Cell2 works is f2. Cell3 is a primary cell, and a frequency where Cell3 works is f1. Cell4 is a secondary assisted cell of Cell1, and a frequency where Cell4 works is f2.

After the cell reconfiguration, the cells that participate in the MF-Tx and provide services for the UE are two cells Cell1 and Cell2 of NodeB1 and two cells Cell5 and Cell6 of NodeB3. A frequency where Cell5 works is f1, and a frequency where Cell6 works is f2.

NodeB1 and NodeB3 receive the RRC reconfiguration message and learn, according to the cell identification information of the multiple cells that participate in the MF-Tx, that after the cell reconfiguration, the serving cell is Cell1, the primary cell is Cell5, the secondary cell is Cell2, and the secondary assisted cell is Cell6, where the cell identification information is carried in the RRC reconfiguration message. The secondary cell Cell2 is a cell that participates in the MF-Tx and serves the UE before NodeB1 receives the RRC reconfiguration message, and a state of the secondary cell Cell2 is kept unchanged. The secondary assisted cell Cell6 is not a cell that participates in the MF-Tx and serves the UE before NodeB3 receives the RRC reconfiguration message, and the secondary assisted cell Cell6 is activated. Meanwhile, the serving cell Cell1 and the primary cell Cell5 are activated.

It should be noted that the foregoing implementation manners are a part of implementation manners listed according to the method for controlling cell activation provided in the present invention. Other implementation manners that are not mentioned in this embodiment but may be obtained by persons skilled in the art according to the technical solutions in the present invention without creative efforts shall fall within the protection scope of the present invention.

According to the method for controlling cell activation provided in the embodiment of the present invention, determination is performed according to cell identification information of multiple cells in an RRC reconfiguration message, and a UE is instructed to take a corresponding action, so that a serving cell and a primary cell are in an activated state, and a secondary cell or a secondary assisted cell is kept in an original state if it is a cell that previously participated in MF-Tx, or is activated if it is not a cell that previously participated in the MF-Tx. This implements reconfiguration through RRC signaling in an MF-Tx work mode, and implements activation control for the cell when the reconfiguration through RRC signaling causes a change to a cell serving the UE. Meanwhile, the base station transparently transmits the RRC reconfiguration message to the UE, which can ensure a common knowledge on a network side and a terminal side.

Figure 2:
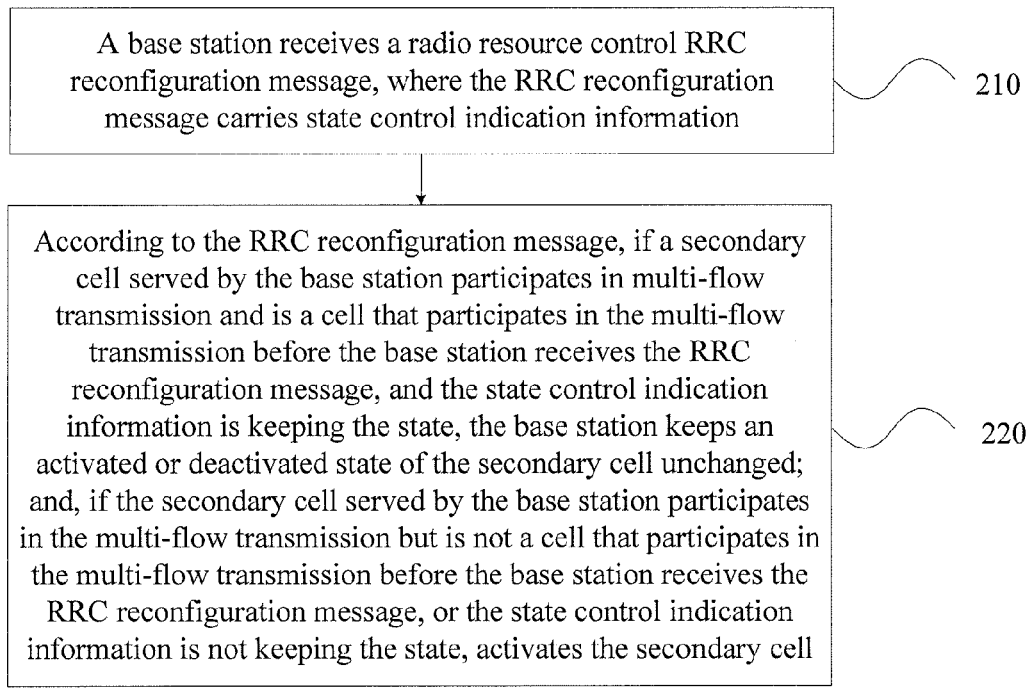
FIG. 2 is a flowchart of a second method for controlling cell activation according to an embodiment of the present invention.

FIG. 2 is a flowchart of a second method for controlling cell activation according to an embodiment of the present invention. As shown in FIG. 2, the method for controlling cell activation provided in this embodiment may be specifically applied to a cell activation control processing process in which a communications system supporting an MF-Tx work mode allows multiple cells to simultaneously send high speed downlink packet access data to a UE. The communications system may be a wideband code division multiple access (Wideband Code Division Multiple Access, WCDMA for short) communications system. The communications system may also be a long term evolution (Long Term Evolution, LTE for short) communications system. In the WCDMA communications system, a base station Node B and a radio network controller (Radio Network Controller, RNC for short) are provided. In the LTE communications system, an evolved base station (E-UTRAN Node B, eNB for short) can implement functions of the Node B and the RNC. The following uses the WCDMA communications system as an example to elaborate on the method for controlling cell activation provided in this embodiment.

The method for controlling cell activation provided in this embodiment specifically includes the following steps:

Step 210: A base station receives a radio resource control RRC reconfiguration message, where the RRC reconfiguration message carries state control indication information.

Specifically, the base station receives the radio resource control RRC reconfiguration message, where the RRC reconfiguration message carries cell identification information of multiple cells and the state control indication information.

In the MF-Tx work mode, a UE may simultaneously receive data from HS-DSCHs of the multiple cells at a cell edge, where the multiple cells that participate in MF-Tx may be served by a same base station or may also be served by different base stations. The cells that participate in the MF-Tx may be changed and cell reconfiguration may be caused by multiple factors. For example, the UE generally sends a measurement report to the base station; the base station sends the measurement report to an RNC; when the RNC learns, according to the measurement report, that channel quality of a cell currently serving the UE is poor or a cell that has better channel quality exists, the RNC may reconfigure a cell for the UE and generate an RRC reconfiguration message, where the RRC reconfiguration message carries the cell identification information of the multiple cells that participate in the MF-Tx, and the multiple cells are cells that are reconfigured and participate in the MF-Tx. The RNC sends the RRC reconfiguration message to the base station. When the cells that are reconfigured and participate in the MF-Tx are served by multiple base stations, the RNC sends the RRC reconfiguration message to the multiple base stations separately.

In a practical application process, a field in the RRC reconfiguration message is used to carry the cell identification information of the multiple cells that participate in the MF-Tx. The cell identification information of the multiple cells that participate in the MF-Tx specifically carries an identifier of a cell serving as a serving cell, an identifier of a cell serving as a primary cell, an identifier of a cell serving as a secondary cell, and an identifier of a cell serving as a secondary assisted cell, where both the secondary cell and the secondary assisted cell may be called secondary cells. Cells that are indicated by the cell identification information of the multiple cells are cells that are reconfigured and participate in the MF-Tx. The RRC reconfiguration message also carries the state control indication information. There are multiple pieces of state control indication information and multiple secondary cells, where each piece of the state control indication information corresponds to one secondary cell and indicates that the secondary cell should be kept in an original state or should be activated. There may also be one piece of the state control indication information. When there is one piece of state control indication information, the state control indication information may indicate that all cells that participate in the MF-Tx and are carried in the RRC reconfiguration message should be kept in original states or should be activated.

Step 220: According to the RRC reconfiguration message, if a secondary cell served by the base station participates in multi-flow transmission and is a cell that participates in the multi-flow transmission before the base station receives the RRC reconfiguration message, and the state control indication information is keeping the state, the base station keeps an activated or deactivated state of the secondary cell unchanged; and, if the secondary cell served by the base station participates in the multi-flow transmission but is not a cell that participates in the multi-flow transmission before the base station receives the RRC reconfiguration message, or the state control indication information is not keeping the state, activates the secondary cell.

Specifically, if the base station determines and learns, according to the cell identification information of the multiple cells that participate in the MF-Tx, that a first cell served by the base station among the multiple cells that participate in the MF-Tx is the secondary cell or the secondary assisted cell and is a cell that participates in the MF-Tx before the base station receives the RRC reconfiguration message, and the state control indication information carried in the RRC reconfiguration message is keeping the state, the base station keeps an activated or deactivated state of the first cell unchanged, where the cell identification information is carried in the RRC reconfiguration message. That is, if the cell state of the first cell is an activated state before the base station receives the RRC reconfiguration message, the first cell is kept in the activated state; and, if the cell state of the first cell is a deactivated state before the base station receives the RRC reconfiguration message, the first cell continues to be kept in the deactivated state.

If the base station determines and learns, according to the cell identification information of the multiple cells that participate in the MF-Tx, that a second cell served by the base station among the multiple cells that participate in the MF-Tx is the secondary cell or the secondary assisted cell and is a cell that participates in the MF-Tx before the base station receives the RRC reconfiguration message, but the state control indication information carried in the RRC reconfiguration message indicates that the secondary cell or the secondary assisted cell of the second cell should not be kept in an original state, the base station activates the second cell, where the cell identification information is carried in the RRC reconfiguration message. More cells are activated to serve the UE so as to meet a current requirement of the UE.

If the base station determines and learns, according to the cell identification information of the multiple cells that participate in the MF-Tx, that a third cell served by the base station among the multiple cells that participate in the MF-Tx is the secondary cell or the secondary assisted cell, but the third cell is not a cell that participates in the MF-Tx before the base station receives the RRC reconfiguration message, the base station activates the third cell, where the cell identification information is carried in the RRC reconfiguration message.

In a practical application, the RNC further transparently transmits the RRC reconfiguration message to the UE through the base station, so as to ensure a common knowledge about cell reconfiguration on a network side and a user equipment side.

According to the method for controlling cell activation provided in the embodiment of the present invention, a base station receives a radio resource control RRC reconfiguration message, where the RRC reconfiguration message carries state control indication information; according to the RRC configuration message, if a secondary cell served by the base station participates in multi-flow transmission and is a cell that participates in the multi-flow transmission before the base station receives the RRC reconfiguration message, and the state control indication information is keeping the state, the base station keeps an activated or deactivated state of the secondary cell unchanged; and, if the secondary cell served by the base station participates in the multi-flow transmission but is not a cell that participates in the multi-flow transmission before the base station receives the RRC reconfiguration message, or the state control indication information is not keeping the state, the base station activates the secondary cell. This implements reconfiguration through RRC signaling in an MF-Tx work mode, and implements activation control for a cell when the reconfiguration through RRC signaling causes a change to a cell serving a UE.

In the foregoing embodiment, the RRC reconfiguration message carries cell identification information for serving cell change.

In one aspect, if the base station determines and learns, according to the cell identification information for serving cell change of a cell that participates in the MF-Tx, that a fourth cell served by the base station among the multiple cells that participate in the MF-Tx is a serving cell, and the serving cell is changed, the base station activates the fourth cell, where the cell identification information is carried in the RRC reconfiguration message.

Specifically, if the fourth cell served by the base station among the multiple cells that are reconfigured and participate in the MF-Tx is the serving cell and the fourth cell is not a serving cell that serves the UE before the base station receives the RRC reconfiguration message, that is, the serving cell is changed, the fourth cell is activated, so as to ensure that the serving cell is in the activated state.

In another aspect, if the base station determines and learns, according to the cell identification information for serving cell change of a cell that participates in the MF-Tx, that a fifth cell served by the base station among the multiple cells that participate in the MF-Tx is a serving cell, and the serving cell is not changed, the base station keeps the fifth cell in an activated state, where the cell identification information is carried in the RRC reconfiguration message.

Specifically, if the fifth cell served by the base station among the multiple cells that are reconfigured and participate in the MF-Tx is the serving cell and the fifth cell is also the serving cell that serves the UE before the base station receives the RRC reconfiguration message, that is, the serving cell is not changed, the fifth cell is kept in the activated state, so as to ensure that the serving cell is in the activated state.

In the foregoing embodiment, after the base station receives the radio resource control RRC reconfiguration message, the method may further include:

if the base station determines and learns, according to the cell identification information of the multiple cells that participate in the MF-Tx, that a sixth cell served by the base station among the multiple cells that participate in the MF-Tx is the primary cell, activating, by the base station, the sixth cell, where the cell identification information is carried in the RRC reconfiguration message.

Specifically, after the base station performs determination according to the cell identification information of the multiple cells that are reconfigured and participate in the MF-Tx, if the base station learns that the sixth cell served by the base station among the multiple cells that participate in the MF-Tx is the primary cell, the base station activates the sixth cell, so as to ensure the primary cell is in the activated state, where the cell identification information is carried in the RRC reconfiguration message.

To describe more clearly the method for controlling cell activation provided in the embodiment of the present invention, the following uses a base station working in a DF-4C mode as an example to elaborate on the method for controlling cell activation provided in this embodiment. The work mode is as follows: The number of cells that participate in the MF-Tx and provide services for the UE is four, where the four cells are cells that are served by different base stations and work at f1 and f2 frequencies separately. The method for controlling cell activation provided in the embodiment of the present invention is definitely applicable to an nF-mC mode, that is, a work mode in which the number of cells that participate in the MF-Tx and provide services for the UE is m, where the m cells are cells that are served by different base stations and work at frequencies f1, f2, to fn.

First Implementation Manner:

Before cell reconfiguration, cells that participate in the MF-Tx and provide services for the UE are two cells Cell1 and Cell2 of NodeB1 and two cells Cell3 and Cell4 of NodeB2. That is, Cell1, Cell2, Cell3, and Cell4 form cells that participate in the MF-Tx before the cell reconfiguration. Cell1 is a serving cell, and a frequency where Cell1 works is f1. Cell2 is a secondary cell of Cell1, and a frequency where Cell2 works is f2. Cell3 is an assisted cell of Cell1, that is, a primary cell, and a frequency where Cell3 works is f1. Cell4 is a secondary assisted cell of Cell1, and a frequency where Cell4 works is f2. It should be noted that both Cell1 and Cell3 are primary cells. For ease of description, Cell1 is called the serving cell, and Cell3 is called the primary cell.

After the cell reconfiguration, the cells that participate in the MF-Tx and provide services for the UE are two cells Cell1 and Cell2 of NodeB1 and two cells Cell3 and Cell4 of NodeB2.

NodeB1 and NodeB2 receive the RRC reconfiguration message and learn, according to the cell identification information of the multiple cells that participate in the MF-Tx, that after the cell reconfiguration, the serving cell is Cell3, the primary cell is Cell1, the secondary cell is Cell4, and the secondary assisted cell is Cell2, where the cell identification information is carried in the RRC reconfiguration message, and the RRC reconfiguration message carries state control indication information of secondary assisted cell Cell2 continue and secondary cell Cell4 continue. Because the secondary assisted cell Cell2 is a cell that participates in the MF-Tx and serves the UE before NodeB1 receives the RRC reconfiguration message, and the RRC reconfiguration message carries the state control indication information of secondary assisted cell Cell2 continue, a state of the secondary assisted cell Cell2 is kept unchanged. Because the secondary cell Cell4 is a cell that participates in the MF-Tx and serves the UE before NodeB2 receives the RRC reconfiguration message, and the RRC reconfiguration message carries the state control indication information of secondary cell Cell4 continue, a state of the secondary cell Cell4 is kept unchanged. Meanwhile, the serving cell Cell3 and the primary cell Cell1 are activated.

If the state control indication information carried in the RRC reconfiguration message received by NodeB1 and NodeB2 carries only one piece of information of secondary assisted cell Cell2 continue, the state of the secondary assisted cell Cell2 is kept unchanged, and the secondary cell Cell4 that participates in the MF-Tx and serves the UE before the base station receives the RRC reconfiguration message will be activated.

If the state control indication information carried in the RRC reconfiguration message received by NodeB1 and NodeB2 does not carry any information about secondary cell or secondary assisted cell continue, both the secondary cell Cell4 and the secondary assisted cell Cell2 that are carried in the RRC reconfiguration message are activated, no matter whether the secondary cell Cell4 and the secondary assisted cell Cell2 previously participated in the MF-Tx and served the UE.

Second Implementation Manner:

Before cell reconfiguration, cells that participate in the MF-Tx and provide services for the UE are two cells Cell1 and Cell2 of NodeB1 and two cells Cell3 and Cell4 of NodeB2. That is, Cell1, Cell2, Cell3, and Cell4 form cells that participate in the MF-Tx before the cell reconfiguration. Cell1 is a serving cell, and a frequency where Cell1 works is f1. Cell2 is a secondary cell of Cell1, and a frequency where Cell2 works is f2. Cell3 is an assisted cell of Cell1, that is, a primary cell, and a frequency where Cell3 works is f1. Cell4 is a secondary assisted cell of Cell1, and a frequency where Cell4 works is f2.

After the cell reconfiguration, the cells that participate in the MF-Tx and provide services for the UE are two cells Cell3 and Cell4 of NodeB2 and two cells Cell5 and Cell6 of NodeB3. A frequency where Cell5 works is f1, and a frequency where Cell6 works is f2.

NodeB2 and NodeB3 receive the RRC reconfiguration message and learn, according to the cell identification information cell identification information of the multiple cells that participate in the MF-Tx, that after the cell reconfiguration, the serving cell is Cell5, the primary cell is Cell3, the secondary cell is Cell6, and the secondary assisted cell is Cell4, where the cell identification information is carried in the RRC reconfiguration message, and the RRC reconfiguration message also carries state control indication information of secondary assisted cell Cell4 continue. Because the secondary assisted cell Cell4 is a cell that participates in the MF-Tx and serves the UE before NodeB2 receives the RRC reconfiguration message, and the RRC reconfiguration message carries the state control indication information of secondary assisted cell Cell4 continue, a state of the secondary assisted cell Cell4 is kept unchanged. Because the secondary cell Cell6 is not a cell that participates in the MF-Tx and serves the UE before NodeB3 receives the RRC reconfiguration message, the secondary cell Cell6 is activated. Meanwhile, the serving cell Cell5 and the primary cell Cell3 are activated.

If the state control indication information carried in the RRC reconfiguration message received by NodeB1 and NodeB2 does not carry any information about secondary cell or secondary assisted cell continue, both the secondary cell Cell6 and the secondary assisted cell Cell4 that are carried in the RRC reconfiguration message are activated, no matter whether the secondary cell Cell6 and the secondary assisted cell Cell4 previously participated in the MF-Tx and served the UE.

If the state control indication information carried in the RRC reconfiguration message received by NodeB1 and NodeB2 carries one piece of continue information but is not specific to any secondary cell or secondary assisted cell, and it is determined that the secondary assisted cell Cell4 is a cell that participates in the MF-Tx and serves the UE before the RRC reconfiguration message is received, the state of the secondary assisted cell is kept unchanged.

Third Implementation Manner:

Before cell reconfiguration, cells that participate in the MF-Tx and provide services for the UE are two cells Cell1 and Cell2 of NodeB1 and two cells Cell3 and Cell4 of NodeB2. That is, Cell1, Cell2, Cell3, and Cell4 form cells that participate in the MF-Tx before the cell reconfiguration. Cell1 is a serving cell, and a frequency where Cell1 works is f1. Cell2 is a secondary cell of Cell1, and a frequency where Cell2 works is f2. Cell3 is an assisted cell of Cell1, that is, a primary cell, and a frequency where Cell3 works is f1. Cell4 is a secondary assisted cell of Cell1, and a frequency where Cell4 works is f2.

After the cell reconfiguration, the cells that participate in the MF-Tx and provide services for the UE are two cells Cell5 and Cell6 of NodeB3 and two cells Cell7 and Cell8 of NodeB4. A frequency where Cell5 works is f1, a frequency where Cell6 works is f2, a frequency where Cell7 works is f1, and a frequency where Cell8 works is f2.

NodeB3 and NodeB4 receive the RRC reconfiguration message and learn, according to the cell identification information of the multiple cells that participate in the MF-Tx, that after the cell reconfiguration, the serving cell is Cell5, the primary cell is Cell7, the secondary cell is Cell6, and the secondary assisted cell is Cell8, where the cell identification information is carried in the RRC reconfiguration message. The secondary cell Cell6 is not a cell that participates in the MF-Tx and serves the UE before NodeB3 receives the RRC reconfiguration message, and the secondary cell Cell6 is activated. The secondary assisted cell Cell8 is not a cell that participates in the MF-Tx and serves the UE before NodeB4 receives the RRC reconfiguration message, and the secondary assisted cell Cell8 is activated. Meanwhile, the serving cell Cell5 and the primary cell Cell7 are activated.

Fourth Implementation Manner:

Before cell reconfiguration, cells that participate in the MF-Tx and provide services for the UE are two cells Cell1 and Cell2 of NodeB1 and two cells Cell3 and Cell4 of NodeB2. That is, Cell1, Cell2, Cell3, and Cell4 form cells that participate in the MF-Tx before the cell reconfiguration. Cell1 is a serving cell, and a frequency where Cell1 works is f1. Cell2 is a secondary cell of Cell1, and a frequency where Cell2 works is f2. Cell3 is an assisted cell of Cell1, that is, a primary cell, and a frequency where Cell3 works is f1. Cell4 is a secondary assisted cell of Cell1, and a frequency where Cell4 works is f2.

After the cell reconfiguration, the cells that participate in the MF-Tx and provide services for the UE are two cells Cell1 and Cell2 of NodeB1 and two cells Cell3 and Cell4 of NodeB2.

NodeB1 and NodeB2 receive the RRC reconfiguration message and learn, according to the cell identification information of the multiple cells that participate in the MF-Tx, that after the cell reconfiguration, the serving cell is Cell1, the primary cell is Cell3, the secondary cell is Cell2, and the secondary assisted cell is Cell4, where the cell identification information is carried in the RRC reconfiguration message, and the RRC reconfiguration message carries state control indication information of secondary cell Cell2 continue and secondary assisted cell Cell4 continue. Because the secondary cell Cell2 is a cell that participates in the MF-Tx and serves the UE before NodeB1 receives the RRC reconfiguration message, and the RRC reconfiguration message carries the state control indication information of secondary cell Cell2 continue, a state of the secondary cell Cell2 is kept unchanged. Because the secondary assisted cell Cell4 is a cell that participates in the MF-Tx and serves the UE before NodeB2 receives the RRC reconfiguration message, and the RRC reconfiguration message carries the state control indication information of secondary assisted cell Cell4 continue, a state of the secondary assisted cell Cell4 is kept unchanged. Meanwhile, the serving cell Cell1 and the primary cell Cell3 are activated.

If the state control indication information carried in the RRC reconfiguration message received by NodeB1 and NodeB2 does not carry any information about secondary cell or secondary assisted cell continue, both the secondary cell Cell2 and the secondary assisted cell Cell4 that are carried in the RRC reconfiguration message are activated, no matter whether the secondary cell Cell2 and the secondary assisted cell Cell4 previously participated in the MF-Tx and served the UE.

Fifth Implementation Manner:

Before cell reconfiguration, cells that participate in the MF-Tx and provide services for the UE are two cells Cell1 and Cell2 of NodeB1 and two cells Cell3 and Cell4 of NodeB2. That is, Cell1, Cell2, Cell3, and Cell4 form cells that participate in the MF-Tx before the cell reconfiguration. Cell1 is a serving cell, and a frequency where Cell1 works is f1. Cell2 is a secondary cell of Cell1, and a frequency where Cell2 works is f2. Cell3 is an assisted cell of Cell1, that is, a primary cell, and a frequency where Cell3 works is f1. Cell4 is a secondary assisted cell of Cell1, and a frequency where Cell4 works is f2.

After the cell reconfiguration, the cells that participate in the MF-Tx and provide services for the UE are two cells Cell1 and Cell2 of NodeB1 and two cells Cell5 and Cell6 of NodeB3. A frequency where Cell5 works is f1, and a frequency where Cell6 works is f2.

NodeB1 and NodeB3 receive the RRC reconfiguration message and learn, according to the cell identification information of the multiple cells that participate in the MF-Tx, that after the cell reconfiguration, the serving cell is Cell1, the primary cell is Cell5, the secondary cell is Cell2, and the secondary assisted cell is Cell6, where the cell identification information is carried in the RRC reconfiguration message, and the RRC reconfiguration message also carries state control indication information of secondary cell Cell2 continue. Because the secondary cell Cell2 is a cell that participates in the MF-Tx before NodeB1 receives the RRC reconfiguration message, and the RRC reconfiguration message carries the state control indication information of secondary cell Cell2 continue, a state of the secondary cell Cell2 is kept unchanged. The secondary assisted cell Cell6 is not a cell that participates in the MF-Tx before NodeB3 receives the RRC reconfiguration message, and the secondary assisted cell Cell6 is activated. Meanwhile, the serving cell Cell1 and the primary cell Cell5 are activated.

If the state control indication information carried in the RRC reconfiguration message received by NodeB1 and NodeB3 carries information about secondary cell Cell2 no continue, correspondingly, the secondary cell Cell2 will be activated.

It should be noted that the foregoing implementation manners are a part of implementation manners listed according to the method for controlling cell activation provided in this embodiment. Other implementation manners that are not mentioned in this embodiment but may be obtained by persons skilled in the art according to the technical solutions in the present invention without creative efforts shall fall within the protection scope of the present invention.

According to the method for controlling cell activation provided in the embodiment of the present invention, a base station receives a radio resource control RRC reconfiguration message, where the RRC reconfiguration message carries state control indication information; according to the RRC configuration message, if a secondary cell served by the base station participates in multi-flow transmission and is a cell that participates in the multi-flow transmission before the base station receives the RRC reconfiguration message, and the state control indication information is keeping the state, the base station keeps an activated or deactivated state of the secondary cell unchanged; and, if the secondary cell served by the base station participates in the multi-flow transmission but is not a cell that participates in the multi-flow transmission before the base station receives the RRC reconfiguration message, or the state control indication information is not keeping the state, the base station activates the secondary cell. This implements activation control for a cell in an MF-Tx work mode. Meanwhile, the state control indication information carried in the RRC reconfiguration message can also flexibly indicate that the secondary cell that participates in the multi-flow transmission should be kept in an original state or should be activated, which makes the activation control for the cell more flexible.

A person of ordinary skill in the art may understand that all or a part of the steps of the foregoing method embodiments may be implemented by a program instructing relevant hardware. The aforementioned program may be stored in a computer readable storage medium. When the program runs, the steps of the forgoing method embodiments are performed. The foregoing storage medium includes any medium capable of storing program code, such as a ROM, a RAM, a magnetic disk, or an optical disc.

Figure 3:
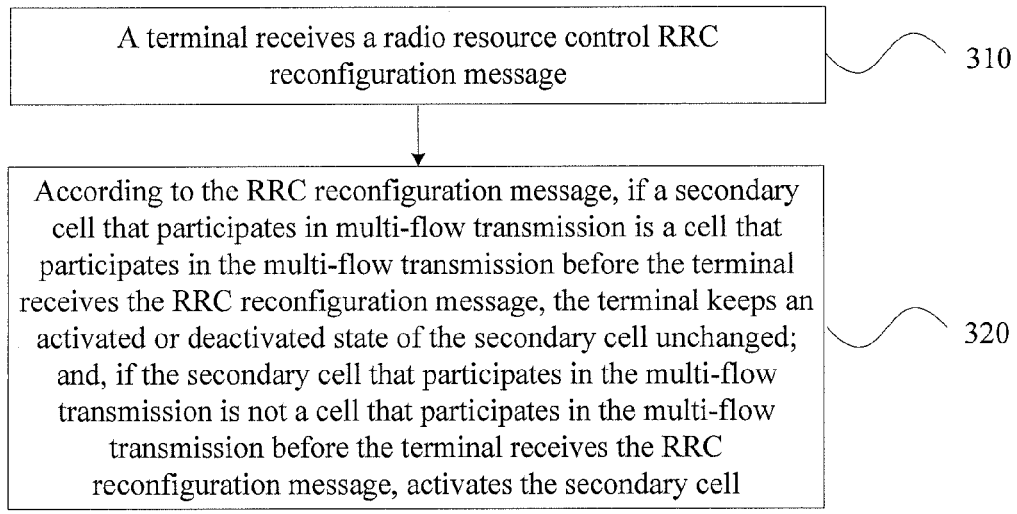
FIG. 3 is a flowchart of a third method for controlling cell activation according to an embodiment of the present invention.

FIG. 3 is a flowchart of a third method for controlling cell activation according to an embodiment of the present invention. As shown in FIG. 3, the method for controlling cell activation provided in this embodiment may be specifically applied to a cell activation control processing process in which a communications system supporting an MF-Tx work mode allows multiple cells to simultaneously send high speed downlink packet access data to a UE. The communications system may be a wideband code division multiple access (Wideband Code Division Multiple Access, WCDMA for short) communications system. The communications system may also be a long term evolution (Long Term Evolution, LTE for short) communications system. In the WCDMA communications system, a base station Node B and a radio network controller (Radio Network Controller, RNC for short) are provided. In the LTE communications system, an evolved base station (E-UTRAN Node B, eNB for short) can implement functions of the Node B and the RNC. The following uses the WCDMA communications system as an example to elaborate on the method for controlling cell activation provided in this embodiment.

The method for controlling cell activation provided in this embodiment specifically includes the following steps:

Step 310: A terminal receives a radio resource control RRC reconfiguration message.

The RRC reconfiguration message carries cell identification information of multiple cells that participate in multi-flow transmission.

In a practical application process, a field in the RRC reconfiguration message is used to carry the cell identification information of the multiple cells that participate in the MF-Tx. The cell identification information of the multiple cells that participate in the MF-Tx specifically carries an identifier of a cell serving as a serving cell, an identifier of a cell serving as a primary cell, an identifier of a cell serving as a secondary cell, and an identifier of a cell serving as a secondary assisted cell, where both the secondary cell and the secondary assisted cell may be called secondary cells.

Step 320: According to the RRC reconfiguration message, if a secondary cell that participates in multi-flow transmission is a cell that participates in the multi-flow transmission before the terminal receives the RRC reconfiguration message, the terminal keeps an activated or deactivated state of the secondary cell unchanged; and, if the secondary cell that participates in the multi-flow transmission is not a cell that participates in the multi-flow transmission before the terminal receives the RRC reconfiguration message, activates the secondary cell.

Specifically, after receiving the RRC reconfiguration message sent by an RNC, the terminal performs determination according to the cell identification information of the multiple cells that participate in the MF-Tx, where the cell identification information is carried in the RRC reconfiguration message; and keeps the state of the secondary cell unchanged if the terminal determines and learns that the secondary cell that participates in the MF-Tx after the RRC reconfiguration is a cell that participates in the MF-Tx before the terminal receives the RRC reconfiguration message. That is, if the secondary cell is in an activated state before the terminal receives the RRC reconfiguration message, the activated state of the secondary cell is kept unchanged; and, if the secondary cell is in a deactivated state before the terminal receives the RRC reconfiguration message, the secondary cell continues to be kept in the deactivated state.

If the terminal determines and learns, according to the cell identification information of the multiple cells that participate in the MF-Tx, that the secondary cell among the multiple cells that participate in the MF-Tx is not a cell that participates in the MF-Tx before the terminal receives the RRC reconfiguration message, the terminal activates the secondary cell, where the cell identification information is carried in the RRC reconfiguration message.

In the foregoing embodiment, further, the RRC reconfiguration message may further carry cell identification information for serving cell change.

According to the method for controlling cell activation provided in the embodiment of the present invention, a terminal receives a radio resource control RRC reconfiguration message, where the RRC reconfiguration message carries identification information of cells that participate in the MF-Tx; according to the RRC reconfiguration message, if a secondary cell that participates in multi-flow transmission is a cell that participates in the multi-flow transmission before the terminal receives the RRC reconfiguration message, the terminal keeps an activated or deactivated state of the secondary cell unchanged; and, if the secondary cell that participates in the multi-flow transmission is not a cell that participates in the multi-flow transmission before the terminal receives the RRC reconfiguration message, the terminal activates the secondary cell. This implements reconfiguration through RRC signaling in an MF-Tx work mode, and implements activation control for a cell when the reconfiguration through RRC signaling causes a change to a cell serving a UE.

Figure 4:
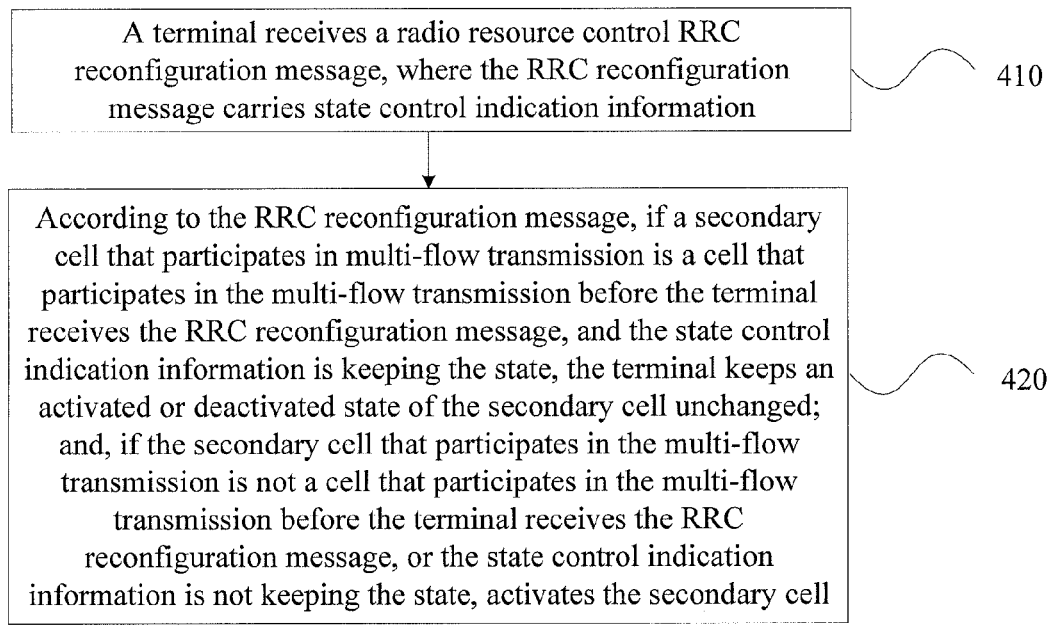
FIG. 4 is a flowchart of a fourth method for controlling cell activation according to an embodiment of the present invention.

FIG. 4 is a flowchart of a fourth method for controlling cell activation according to an embodiment of the present invention. As shown in FIG. 4, the method for controlling cell activation provided in this embodiment may be specifically applied to a cell activation control processing process in which a communications system supporting an MF-Tx work mode allows multiple cells to simultaneously send high speed downlink packet access data to a UE. The communications system may be a wideband code division multiple access (Wideband Code Division Multiple Access, WCDMA for short) communications system. The communications system may also be a long term evolution (Long Term Evolution, LTE for short) communications system. In the WCDMA communications system, a base station Node B and a radio network controller (Radio Network Controller, RNC for short) are provided. In the LTE communications system, an evolved base station (E-UTRAN Node B, eNB for short) can implement functions of the Node B and the RNC. The following uses the WCDMA communications system as an example to elaborate on the method for controlling cell activation provided in this embodiment.

The method for controlling cell activation provided in this embodiment specifically includes the following steps:

Step 410: A terminal receives a radio resource control RRC reconfiguration message, where the RRC reconfiguration message carries state control indication information.

Specifically, the terminal receives the radio resource control RRC reconfiguration message, where the RRC reconfiguration message carries cell identification information of multiple cells and the state control indication information.

In a practical application process, a field in the RRC reconfiguration message is used to carry the cell identification information of the multiple cells that participate in the MF-Tx. The cell identification information of the multiple cells that participate in the MF-Tx specifically carries an identifier of a cell serving as a serving cell, an identifier of a cell serving as a primary cell, an identifier of a cell serving as a secondary cell, and an identifier of a cell serving as a secondary assisted cell, where both the secondary cell and the secondary assisted cell may be called secondary cells. Cells that are indicated by the cell identification information of the multiple cells are cells that are reconfigured and participate in the MF-Tx. The RRC reconfiguration message also carries the state control indication information. There are multiple pieces of state control indication information and multiple secondary cells, where each piece of the state control indication information corresponds to one secondary cell and indicates that the secondary cell should be kept in an original state or should be activated. There may also be one piece of the state control indication information. When there is one piece of the state control indication information, the state control indication information may indicate that all cells that participate in the MF-Tx and are carried in the RRC reconfiguration message should be kept in original states or should be activated.

Step 420: According to the RRC reconfiguration message, if a secondary cell that participates in multi-flow transmission is a cell that participates in the multi-flow transmission before the terminal receives the RRC reconfiguration message, and the state control indication information is keeping the state, the terminal keeps an activated or deactivated state of the secondary cell unchanged; and, if the secondary cell that participates in the multi-flow transmission is not a cell that participates in the multi-flow transmission before the terminal receives the RRC reconfiguration message, or the state control indication information is not keeping the state, activates the secondary cell.

Specifically, the terminal receives the RRC reconfiguration message; according to the cell information of the multiple cells that participate in the MF-Tx, if the secondary cell that participates in the MF-Tx is a cell that participates in the multi-flow transmission before the terminal receives the RRC reconfiguration message, and state control indication information carried in the RRC reconfiguration message is also keeping the state, keeps the activated or deactivated state of the secondary cell unchanged; and, if the secondary cell that participates in the MF-Tx is not a cell that participates in the multi-flow transmission before the terminal receives the RRC reconfiguration message, or the state control indication information carried in the RRC reconfiguration message is not keeping the state, activates the secondary cell, where the cell information is carried in the RRC reconfiguration message.

In the foregoing embodiment, further, the RRC reconfiguration message received by the terminal may further carry cell identification information for serving cell change.

According to the method for controlling cell activation provided in the embodiment of the present invention, a terminal receives a radio resource control RRC reconfiguration message, where the RRC reconfiguration message carries state control indication information; according to the RRC configuration message, if a secondary cell that participates in multi-flow transmission is a cell that participates in the multi-flow transmission before the terminal receives the RRC reconfiguration message, and the state control indication information is keeping the state, the terminal keeps an activated or deactivated state of the secondary cell unchanged; and, if the secondary cell that participates in the multi-flow transmission is not a cell that participates in the multi-flow transmission before the terminal receives the RRC reconfiguration message, or the state control indication information is not keeping the state, the terminal activates the secondary cell. This implements activation control for a cell in an MF-Tx work mode. Meanwhile, the state control indication information carried in the RRC reconfiguration message can also flexibly indicate that the secondary cell that participates in the multi-flow transmission should be kept in an original state or should be activated, which makes the activation control for the cell more flexible.

Figure 5:
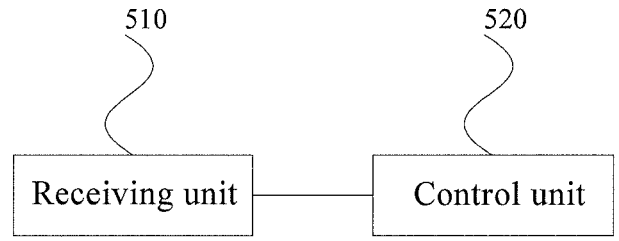
FIG. 5 is a schematic structural diagram of a first base station according to an embodiment of the present invention.

FIG. 5 is a schematic structural diagram of a first base station according to an embodiment of the present invention. As shown in FIG. 5, the base station provided in this embodiment can be applied to a cell activation control processing process in which a communications system supporting an MF-Tx work mode allows multiple cells to simultaneously send high speed downlink packet access data to a UE. The communications system may be a wideband code division multiple access (Wideband Code Division Multiple Access, WCDMA for short) communications system. The communications system may also be a long term evolution (Long Term Evolution, LTE for short) communications system. In the WCDMA communications system, a base station Node B and a radio network controller (Radio Network Controller, RNC for short) are provided. In the LTE communications system, an evolved base station (E-UTRAN Node B, eNB for short) can implement functions of the Node B and the RNC. The following uses the WCDMA communications system as an example to elaborate on the method for controlling cell activation provided in this embodiment.

The base station provided in this embodiment specifically includes a receiving unit 510 and a control unit 520. The receiving unit 510 is configured to receive a radio resource control RRC reconfiguration message. The control unit 520, connected to the receiving unit 510, is configured to: according to the RRC reconfiguration message, if a secondary cell served by the base station participates in multi-flow transmission and is a cell that participates in the multi-flow transmission before the base station receives the RRC reconfiguration message, keep an activated or deactivated state of the secondary cell unchanged; and, if the secondary cell served by the base station participates in the multi-flow transmission but is not a cell that participates in the multi-flow transmission before the base station receives the RRC reconfiguration message, activate the secondary cell.

In the MF-Tx work mode, a UE may simultaneously receive data sent by HS-DSCHs of the multiple cells at a cell edge. The multiple cells that participate in the MF-Tx may be served by a same base station or may also be served by different base stations. The cells that participate in the MF-Tx may be changed and cell reconfiguration may be caused by multiple factors. For example, the UE generally sends a measurement report to the base station; the base station sends the measurement report to an RNC; when the RNC learns, according to the measurement report, that channel quality of a cell currently serving the UE is poor or a cell that has better channel quality exists, the RNC may reconfigure a cell for the UE and generate an RRC reconfiguration message, where the RRC reconfiguration message carries the cell identification information of the multiple cells that participate in the MF-Tx, and the multiple cells are cells that are reconfigured and participate in the MF-Tx. The RNC sends the RRC reconfiguration message to the base station. When the cells that are reconfigured and participate in the MF-Tx are served by multiple base stations, the RNC sends the RRC reconfiguration message to the multiple base stations separately.

In a practical application process, a field in the RRC reconfiguration message is used to carry the cell identification information of the multiple cells that participate in the MF-Tx. The cell identification information of the multiple cells that participate in the MF-Tx specifically carries an identifier of a cell serving as a serving cell, an identifier of a cell serving as a primary cell, an identifier of a cell serving as a secondary cell, and an identifier of a cell serving as a secondary assisted cell, where both the secondary cell and the secondary assisted cell may be called secondary cells.

According to the RRC reconfiguration message, if a secondary cell served by the base station participates in multi-flow transmission and is a cell that participates in the multi-flow transmission before the base station receives the RRC reconfiguration message, the control unit 520 keeps the activated or deactivated state of the secondary cell unchanged; and, if the secondary cell served by the base station participates in the multi-flow transmission but is not a cell that participates in the multi-flow transmission before the base station receives the RRC reconfiguration message, activates the secondary cell.

Specifically, if the control unit 520 determines and learns, according to the cell identification information of the multiple cells that participate in the MF-Tx, that a first cell served by the base station among the multiple cells that participate in the MF-Tx is the secondary cell, and the secondary cell is a cell that participates in the MF-Tx before the base station receives the RRC reconfiguration message, the control unit 520 keeps a state of the first cell unchanged, where the cell identification information is carried in the RRC reconfiguration message.

In the foregoing embodiment, if the control unit 520 determines and learns, according to the cell identification information of the multiple cells that participate in the MF-Tx, that a second cell served by the base station among the multiple cells that participate in the MF-Tx is the secondary cell but is not a cell that participates in the MF-Tx before the base station receives the RRC reconfiguration message, the control unit 520 may further activate the second cell.

In the foregoing embodiment, the RRC reconfiguration message may further carry cell identification information for serving cell change. If the control unit 520 determines and learns, according to the cell identification information for serving cell change of a cell that participates in the MF-Tx, that a third cell served by the base station among the multiple cells that participate in the MF-Tx is the serving cell, and the serving cell is changed, the control unit 520 activates the third cell, where the cell identification information is carried in the RRC reconfiguration message.

In the foregoing embodiment, if the control unit 520 determines and learns, according to the cell identification information for serving cell change of a cell that participates in the MF-Tx, that a fourth cell served by the base station among the multiple cells that participate in the MF-Tx is the serving cell, and the serving cell is not changed, the control unit 520 may further keep the fourth cell in an activated state, where the cell identification information is carried in the RRC reconfiguration message.

In the foregoing embodiment, if the control unit 520 determines and learns, according to the cell identification information of the multiple cells that participate in the MF-Tx, that a fifth cell served by the base station among the multiple cells that participate in the MF-Tx is the primary cell, the control unit 520 may further activate the fifth cell, where the cell identification information is carried in the RRC reconfiguration message.

In a practical application, the RNC may further transparently transmit the RRC reconfiguration message to the UE through the base station, so as to ensure a common knowledge about cell reconfiguration on a network side and a user equipment side.

According to the base station provided in the embodiment of the present invention, a receiving unit receives a radio resource control RRC reconfiguration message, where the RRC reconfiguration message carries identification information of cells that participate in MF-Tx; if a control unit determines and learns, according to the RRC reconfiguration message, that a secondary cell of the base station participates in the MF-Tx and is a cell that participates in the MF-Tx before the base station receives the RRC reconfiguration message, the control unit keeps an activated or deactivated state of the secondary cell unchanged; and, if the secondary cell of the base station participates in the MF-Tx but is not a cell that participates in the MF-Tx before the base station receives the RRC reconfiguration message, the control unit activates the secondary cell. This implements reconfiguration through RRC signaling in an MF-Tx work mode, and implements activation control for a cell when the reconfiguration through RRC signaling causes a change to a cell serving a UE. Because the base station knows a cell load condition and an air interface condition more clearly, the activated or deactivated state of the cell can be optimally configured when a previous state is remembered.

Figure 6:
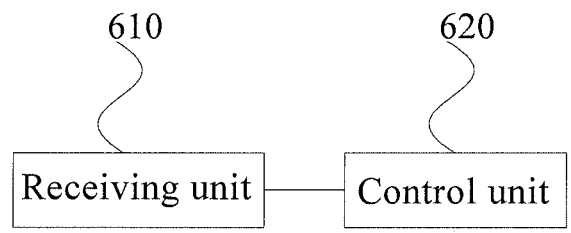
FIG. 6 is a schematic structural diagram of a second base station according to an embodiment of the present invention.

FIG. 6 is a schematic structural diagram of a second base station according to an embodiment of the present invention. As shown in FIG. 6, a method for controlling cell activation provided in this embodiment may be specifically applied to a cell activation control processing process in which a communications system supporting an MF-Tx work mode allows multiple cells to simultaneously send high speed downlink packet access data to a UE. The communications system may be a wideband code division multiple access (Wideband Code Division Multiple Access, WCDMA for short) communications system. The communications system may also be a long term evolution (Long Term Evolution, LTE for short) communications system. In the WCDMA communications system, a base station Node B and a radio network controller (Radio Network Controller, RNC for short) are provided. In the LIE communications system, an evolved base station (E-UTRAN Node B, eNB for short) can implement functions of the Node B and the RNC. The following uses the WCDMA communications system as an example to elaborate on the method for controlling cell activation provided in this embodiment.

The base station provided in this embodiment includes a receiving unit 610 and a control unit 620. The receiving unit 610 is configured to receive a radio resource control RRC reconfiguration message, where the RRC reconfiguration message carries state control indication information. The control unit 620, connected to the receiving unit 610, is configured to: according to the RRC reconfiguration message, if a secondary cell served by the base station participates in multi-flow transmission and is a cell that participates in the multi-flow transmission before the base station receives the RRC reconfiguration message, and the state control indication information is keeping the state, keep an activated or deactivated state of the secondary cell unchanged; and, if the secondary cell served by the base station participates in the multi-flow transmission but is not a cell that participates in the multi-flow transmission before the base station receives the RRC reconfiguration message, or the state control indication information is not keeping the state, activate the secondary cell.

In the MF-Tx work mode, a UE may simultaneously receive data from HS-DSCHs of the multiple cells at a cell edge, where the multiple cells that participate in MF-Tx may be served by a same base station or may also be served by different base stations. The cells that participate in the MF-Tx may be changed and cell reconfiguration may be caused by multiple factors. For example, the UE generally sends a measurement report to the base station; the base station sends the measurement report to an RNC; when the RNC learns, according to the measurement report, that channel quality of a cell currently serving the UE is poor or a cell that has better channel quality exists, the RNC may reconfigure a cell for the UE and generate an RRC reconfiguration message, where the RRC reconfiguration message carries the cell identification information of the multiple cells that participate in the MF-Tx, and the multiple cells are cells that are reconfigured and participate in the MF-Tx. The RNC sends the RRC reconfiguration message to the base station. When the cells that are reconfigured and participate in the MF-Tx are served by multiple base stations, the RNC sends the RRC reconfiguration message to the multiple base stations separately.

In a practical application process, a field in the RRC reconfiguration message is used to carry the cell identification information of the multiple cells that participate in the MF-Tx. The cell identification information of the multiple cells that participate in the MF-Tx specifically carries an identifier of a cell serving as a serving cell, an identifier of a cell serving as a primary cell, an identifier of a cell serving as a secondary cell, and an identifier of a cell serving as a secondary assisted cell, where both the secondary cell and the secondary assisted cell may be called secondary cells. Cells that are indicated by the cell identification information of the multiple cells are cells that are reconfigured and participate in the MF-Tx. The RRC reconfiguration message also carries the state control indication information. There are multiple pieces of state control indication information and multiple secondary cells, where each piece of the state control indication information corresponds to one secondary cell and indicates that the secondary cell should be kept in an original state or should be activated. There may also be one piece of the state control indication information. When there is one piece of the state control indication information, the state control indication information may indicate that all cells that participate in the MF-Tx and are carried in the RRC reconfiguration message should be kept in original states or should be activated.

According to the RRC reconfiguration message, if a secondary cell served by the base station participates in multi-flow transmission and is a cell that participates in the multi-flow transmission before the base station receives the RRC reconfiguration message, and the state control indication information is keeping the state, the control unit 620 keeps an activated or deactivated state of the secondary cell unchanged; and, if the secondary cell served by the base station participates in the multi-flow transmission but is not a cell that participates in the multi-flow transmission before the base station receives the RRC reconfiguration message, or the state control indication information is not keeping the state, activates the secondary cell.

Specifically, if the control unit 620 determines and learns, according to the cell identification information of the multiple cells that participate in the MF-Tx, that a first cell served by the base station among the multiple cells that participate in the MF-Tx is the secondary cell or the secondary assisted cell and is a cell that participates in the MF-Tx before the base station receives the RRC reconfiguration message, and the state control indication information carried in the RRC reconfiguration message is keeping the state, the control unit 620 keeps an activated or deactivated state of the first cell unchanged, where the cell identification information is carried in the RRC reconfiguration message. That is, if the cell state of the first cell is an activated state before the base station receives the RRC reconfiguration message, the first cell is kept in the activated state; and, if the cell state of the first cell is a deactivated state before the base station receives the RRC reconfiguration message, the first cell continues to be kept in the deactivated state.

In the foregoing embodiment, if the control unit 620 determines and learns, according to the cell identification information of the multiple cells that participate in the MF-Tx, that a second cell served by the base station among the multiple cells that participate in the MF-Tx is the secondary cell or the secondary assisted cell and is a cell that participates in the MF-Tx before the base station receives the RRC reconfiguration message, but the state control indication information carried in the RRC reconfiguration message indicates that the secondary cell or the secondary assisted cell of the second cell should not be kept in an original state, the control unit 620 may further activate the second cell, where the cell identification information is carried in the RRC reconfiguration message. More cells are activated to serve the UE so as to meet a current requirement of the UE.

In the foregoing embodiment, if the control unit 620 determines and learns, according to the cell identification information of the multiple cells that participate in the MF-Tx, that a third cell served by the base station among the multiple cells that participate in the MF-Tx is the secondary cell or the secondary assisted cell, but the third cell is not a cell that participates in the MF-Tx before the base station receives the RRC reconfiguration message, the control unit 620 may further activate the third cell, where the cell identification information is carried in the RRC reconfiguration message.

In the foregoing embodiment, the RRC reconfiguration message may further carry cell identification information for serving cell change. If the control unit 620 determines and learns, according to the cell identification information for serving cell change of a cell that participates in the MF-Tx, that a fourth cell served by the base station among the multiple cells that participate in the MF-Tx is the serving cell, and the serving cell is changed, the control unit 620 activates the fourth cell, where the cell identification information is carried in the RRC reconfiguration message.

In the foregoing embodiment, if the control unit 620 determines and learns, according to the cell identification information for serving cell change of a cell that participates in the MF-Tx, that a fifth cell served by the base station among the multiple cells that participate in the MF-Tx is the serving cell, and the serving cell is not changed, the control unit 620 may further keep the fifth cell in an activated state, where the cell identification information is carried in the RRC reconfiguration message.

In the foregoing embodiment, if the control unit 620 determines and learns, according to the cell identification information of the multiple cells that participate in the MF-Tx, that a sixth cell served by the base station among the multiple cells that participate in the MF-Tx is the primary cell, the control unit 620 may further activate the sixth cell, where the cell identification information is carried in the RRC reconfiguration message.

In a practical application, the RNC further transparently transmits the RRC reconfiguration message to the UE through the base station, so as to ensure a common knowledge about cell reconfiguration on a network side and a user equipment side.

According to the method for controlling cell activation provided in the embodiment of the present invention, a base station receives a radio resource control RRC reconfiguration message, where the RRC reconfiguration message carries state control indication information; according to the RRC configuration message, if a secondary cell served by the base station participates in multi-flow transmission and is a cell that participates in the multi-flow transmission before the base station receives the RRC reconfiguration message, and the state control indication information is keeping the state, the base station keeps an activated or deactivated state of the secondary cell unchanged; and, if the secondary cell served by the base station participates in the multi-flow transmission but is not a cell that participates in the multi-flow transmission before the base station receives the RRC reconfiguration message, or the state control indication information is not keeping the state, the base station activates the secondary cell. This implements reconfiguration through RRC signaling in an MF-Tx work mode, and implements activation control for a cell when the reconfiguration through RRC signaling causes a change to a cell serving a UE.

Figure 7:
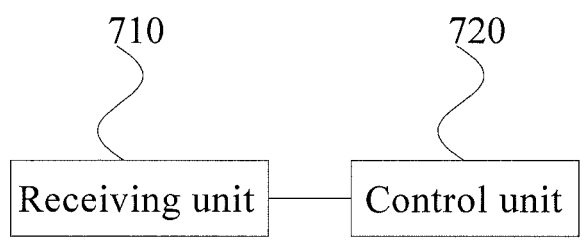
FIG. 7 is a schematic structural diagram of a first terminal according to an embodiment of the present invention.

FIG. 7 is a schematic structural diagram of a first terminal according to an embodiment of the present invention. As shown in FIG. 7, a method for controlling cell activation provided in this embodiment may be specifically applied to a cell activation control processing process in which a communications system supporting an MF-Tx work mode allows multiple cells to simultaneously send high speed downlink packet access data to a UE. The communications system may be a wideband code division multiple access (Wideband Code Division Multiple Access, WCDMA for short) communications system. The communications system may also be a long term evolution (Long Term Evolution, LTE for short) communications system. In the WCDMA communications system, a base station Node B and a radio network controller (Radio Network Controller, RNC for short) are provided. In the LTE communications system, an evolved base station (E-UTRAN Node B, eNB for short) can implement functions of the Node B and the RNC. The following uses the WCDMA communications system as an example to elaborate on the method for controlling cell activation provided in this embodiment.

The terminal provided in this embodiment specifically includes a receiving unit 710 and a control unit 720. The receiving unit 710 is configured to receive a radio resource control RRC reconfiguration message. The control unit 720, connected to the receiving unit 710, is configured to: according to the RRC reconfiguration message, if a secondary cell that participates in multi-flow transmission is a cell that participates in the multi-flow transmission before the terminal receives the RRC reconfiguration message, keep an activated or deactivated state of the secondary cell unchanged; and, if the secondary cell that participates in the multi-flow transmission is not a cell that participates in the multi-flow transmission before the terminal receives the RRC reconfiguration message, activate the secondary cell.

The receiving unit 710 receives the radio resource control RRC reconfiguration message, where the RRC reconfiguration message carries cell identification information of the multiple cells that participate in the multi-flow transmission.

In a practical application process, a field in the RRC reconfiguration message is used to carry the cell identification information of the multiple cells that participate in the MF-Tx. The cell identification information of the multiple cells that participate in the MF-Tx specifically carries an identifier of a cell serving as a serving cell, an identifier of a cell serving as a primary cell, an identifier of a cell serving as a secondary cell, and an identifier of a cell serving as a secondary assisted cell, where both the secondary cell and the secondary assisted cell may be called secondary cells.

According to the RRC reconfiguration message, if a secondary cell that participates in multi-flow transmission is a cell that participates in the multi-flow transmission before the terminal receives the RRC reconfiguration message, the control unit 720 keeps the activated or deactivated state of the secondary cell unchanged; and, if the secondary cell that participates in the multi-flow transmission is not a cell that participates in the multi-flow transmission before the terminal receives the RRC reconfiguration message, activates the secondary cell.

Specifically, after receiving the RRC reconfiguration message sent by an RNC, the control unit 720 performs determination according to the cell identification information of the multiple cells that participate in the MF-Tx, where the cell identification information is carried in the RRC reconfiguration message; and keeps the state of the secondary cell unchanged if the control unit 720 determines and learns that the secondary cell that participates in the MF-Tx after the RRC reconfiguration is a cell that participates in the MF-Tx before the terminal receives the RRC reconfiguration message. That is, if the secondary cell is in an activated state before the terminal receives the RRC reconfiguration message, the activated state of the secondary cell is kept unchanged; and, if the secondary cell is in a deactivated state before the terminal receives the RRC reconfiguration message, the secondary cell continues to be kept in the deactivated state.

After the control unit 720 receives the RRC reconfiguration message sent by an RNC, if the control unit 720 determines and learns, according to the cell identification information of the multiple cells that participate in the MF-Tx, that the secondary cell among the multiple cells that participate in the MF-Tx is not a cell that participates in the MF-Tx before the terminal receives the RRC reconfiguration message, the control unit 720 may further activate the secondary cell, where the cell identification information is carried in the RRC reconfiguration message.

The radio resource control RRC reconfiguration message received by the receiving unit 710 may further carry cell identification information for serving cell change.

According to the terminal provided in the embodiment of the present invention, a receiving unit receives a radio resource control RRC reconfiguration message, where the RRC reconfiguration message carries identification information of cells that participate in the MF-Tx; according to the RRC reconfiguration message, if a secondary cell that participates in multi-flow transmission is a cell that participates in the multi-flow transmission before the terminal receives the RRC reconfiguration message, a control unit keeps an activated or deactivated state of the secondary cell unchanged; and, if the secondary cell that participates in the multi-flow transmission is not a cell that participates in the multi-flow transmission before the terminal receives the RRC reconfiguration message, activates the secondary cell. This implements reconfiguration through RRC signaling in an MF-Tx work mode, and implements activation control for a cell when the reconfiguration through RRC signaling causes a change to a cell serving a UE.

Figure 8:
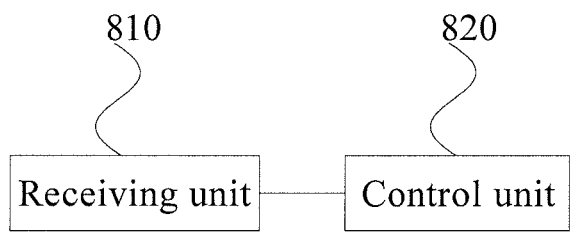
FIG. 8 is a schematic structural diagram of a second terminal according to an embodiment of the present invention.

FIG. 8 is a schematic structural diagram of a second terminal according to an embodiment of the present invention. As shown in FIG. 8, a method for controlling cell activation provided in this embodiment may be specifically applied to a cell activation control processing process in which a communications system supporting an MF-Tx work mode allows multiple cells to simultaneously send high speed downlink packet access data to a UE. The communications system may be a wideband code division multiple access (Wideband Code Division Multiple Access, WCDMA for short) communications system. The communications system may also be a long term evolution (Long Term Evolution, LTE for short) communications system. In the WCDMA communications system, a base station Node B and a radio network controller (Radio Network Controller, RNC for short) are provided. In the LTE communications system, an evolved base station (E-UTRAN Node B, eNB for short) can implement functions of the Node B and the RNC. The following uses the WCDMA communications system as an example to elaborate on the method for controlling cell activation provided in this embodiment.

The terminal provided in this embodiment specifically includes a receiving unit 810 and a control unit 820. The receiving unit 810 is configured to receive a radio resource control RRC reconfiguration message, where the RRC reconfiguration message carries state control indication information. The control unit 820, connected to the receiving unit 810, is configured to: according to the RRC reconfiguration message, if a secondary cell that participates in multi-flow transmission is a cell that participates in the multi-flow transmission before the terminal receives the RRC reconfiguration message, and the state control indication information is keeping the state, keep an activated or deactivated state of the secondary cell unchanged; and, if the secondary cell that participates in the multi-flow transmission is not a cell that participates in the multi-flow transmission before the terminal receives the RRC reconfiguration message, or the state control indication information is not keeping the state, activate the secondary cell.

The receiving unit 810 receives the radio resource control RRC reconfiguration message, where the RRC reconfiguration message carries the state control indication information.

Specifically, the receiving unit 810 receives the radio resource control RRC reconfiguration message, where the RRC reconfiguration message carries cell identification information of multiple cells and the state control indication information.

In a practical application process, a field in the RRC reconfiguration message is used to carry the cell identification information of the multiple cells that participate in the MF-Tx. The cell identification information of the multiple cells that participate in the MF-Tx specifically carries an identifier of a cell serving as a serving cell, an identifier of a cell serving as a primary cell, an identifier of a cell serving as a secondary cell, and an identifier of a cell serving as a secondary assisted cell, where both the secondary cell and the secondary assisted cell may be called secondary cells. Cells that are indicated by the cell identification information of the multiple cells are cells that are reconfigured and participate in the MF-Tx. The RRC reconfiguration message also carries the state control indication information. There are multiple pieces of state control indication information and multiple secondary cells, where each piece of the state control indication information corresponds to one secondary cell and indicates that the secondary cell should be kept in an original state or should be activated. There may also be one piece of the state control indication information. When there is one piece of the state control indication information, the state control indication information may indicate that all cells that participate in the MF-Tx and are carried in the RRC reconfiguration message should be kept in original states or should be activated.

According to the RRC reconfiguration message, if a secondary cell that participates in the multi-flow transmission is a cell that participates in the multi-flow transmission before the terminal receives the RRC reconfiguration message, and the state control indication information is keeping the state, the control unit 820 keeps the activated or deactivated state of the secondary cell unchanged; and, if the secondary cell that participates in the multi-flow transmission is not a cell that participates in the multi-flow transmission before the terminal receives the RRC reconfiguration message, or the state control indication information is not keeping the state, activates the secondary cell.

Specifically, the control unit 820 receives the RRC reconfiguration message; according to the cell information of the multiple cells that participate in the MF-Tx, if the secondary cell that participates in the MF-Tx is a cell that participates in the multi-flow transmission before the terminal receives the RRC reconfiguration message, and state control indication information carried in the RRC reconfiguration message is also keeping the state, keeps the activated or deactivated state of the secondary cell unchanged; and, if the secondary cell that participates in the MF-Tx is not a cell that participates in the multi-flow transmission before the terminal receives the RRC reconfiguration message, or the state control indication information carried in the RRC reconfiguration message is not keeping the state, activates the secondary cell, where the cell information is carried in the RRC reconfiguration message.

The radio resource control RRC reconfiguration message received by the receiving unit 810 may further carry cell identification information for serving cell change.

According to the terminal provided in the embodiment of the present invention, a receiving unit receives a radio resource control RRC reconfiguration message, where the RRC reconfiguration message carries state control indication information; according to the RRC configuration message, if a secondary cell that participates in multi-flow transmission is a cell that participates in the multi-flow transmission before the terminal receives the RRC reconfiguration message, and the state control indication information is keeping the state, a control unit keeps an activated or deactivated state of the secondary cell unchanged; and, if the secondary cell that participates in the multi-flow transmission is not a cell that participates in the multi-flow transmission before the terminal receives the RRC reconfiguration message, or the state control indication information is not keeping the state, the control unit activates the secondary cell. This implements activation control for a cell in an MF-Tx work mode. Meanwhile, the state control indication information carried in the RRC reconfiguration message can also flexibly indicate that the secondary cell that participates in the multi-flow transmission should be kept in an original state or should be activated, which makes the activation control for the cell more flexible.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some or all the technical features thereof, without departing from the spirit and scope of the technical solutions of the embodiments of the present invention.

What is claimed is:

1. A method for controlling cell activation, comprising:
   receiving, by a terminal, a radio resource control (RRC) reconfiguration message; and according to the RRC reconfiguration message, if a secondary cell that participates in multi-flow transmission is a cell that participates in the multi-flow transmission before the terminal receives the RRC reconfiguration message, keeping, by the terminal, an activated or deactivated state of the secondary cell unchanged; and, if the secondary cell that participates in the multi-flow transmission is not a cell that participates in the multi-flow transmission before the terminal receives the RRC reconfiguration message, activating the secondary cell.

2. The method for controlling cell activation according to claim 1, wherein the RRC reconfiguration message carries identification information of cells that participate in the multi-flow transmission.

3. The method for controlling cell activation according to claim 1, wherein the RRC reconfiguration message carries cell identification information for serving cell change.

4. A base station, comprising:
a receiver, configured to receive a radio resource control (RRC) reconfiguration message; and
a processor, connected to the receiver and configured to:
according to the RRC reconfiguration message, if a secondary cell served by the base station participates in multi-flow transmission and is a cell that participates in the multi-flow transmission before the base station receives the RRC reconfiguration message, keep an activated or deactivated state of the secondary cell unchanged; and, if the secondary cell served by the base station participates in the multi-flow transmission but is not a cell that participates in the multi-flow transmission before the base station receives the RRC reconfiguration message, activate the secondary cell.

5. The base station according to claim 4, wherein the RRC reconfiguration message carries identification information of cells that participate in the multi-flow transmission.

6. The base station according to claim 4, wherein the RRC reconfiguration message carries cell identification information for serving cell change.

7. A terminal, comprising:
a receiver, configured to receive a radio resource control (RRC) reconfiguration message; and
a processor, connected to the receiver and configured to:
according to the RRC reconfiguration message, if a secondary cell that participates in multi-flow transmission is a cell that participates in the multi-flow transmission before the terminal receives the RRC reconfiguration message, keep an activated or deactivated state of the secondary cell unchanged; and, if the secondary cell that participates in the multi-flow transmission is not a cell that participates in the multi-flow transmission before the terminal receives the RRC reconfiguration message, activate the secondary cell.

8. The terminal according to claim 7, wherein the RRC reconfiguration message carries identification information of cells that participate in the multi-flow transmission.

9. The terminal according to claim 7, wherein the RRC reconfiguration message carries cell identification information for serving cell change.

* * * * *